(12) United States Patent
El Tahry et al.

(10) Patent No.: US 7,493,896 B2
(45) Date of Patent: Feb. 24, 2009

(54) EXHAUST GAS RECIRCULATION ESTIMATION SYSTEM

(75) Inventors: Sherif H. El Tahry, Troy, MI (US); Ognyan N. Yanakiev, Canton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 34 days.

(21) Appl. No.: 11/646,611

(22) Filed: Dec. 27, 2006

(65) Prior Publication Data

US 2008/0156302 A1 Jul. 3, 2008

(51) Int. Cl.
*F02M 25/07* (2006.01)
*F02B 47/08* (2006.01)
*F28F 27/02* (2006.01)

(52) U.S. Cl. .................. 123/568.12; 165/103; 701/108

(58) Field of Classification Search ............ 123/568.11, 123/568.12, 568.16, 568.21, 676; 60/605.2; 165/103; 701/103, 108

See application file for complete search history.

(56) References Cited

U.S. PATENT DOCUMENTS

| | | | | |
|---|---|---|---|---|
| 6,112,729 A | * | 9/2000 | Barnes et al. | 123/568.21 |
| 6,681,171 B2 | * | 1/2004 | Rimnac et al. | 701/108 |
| 6,871,134 B2 | * | 3/2005 | Lange et al. | 701/108 |
| 6,971,377 B2 | * | 12/2005 | Moyer et al. | 123/568.12 |
| 7,174,713 B2 | * | 2/2007 | Nitzke et al. | 60/605.2 |
| 7,284,544 B2 | * | 10/2007 | Hatano | 123/568.12 |
| 2007/0017489 A1 | * | 1/2007 | Kuroki et al. | 123/568.12 |

FOREIGN PATENT DOCUMENTS

DE  10332698 A1 * 4/2004 ............ 123/568.12

* cited by examiner

*Primary Examiner*—Willis R Wolfe, Jr.

(57) ABSTRACT

A control system and method for an exhaust gas recirculation (EGR) system of an engine includes a first sensor that senses fresh mass air flow, a second sensor that senses charge air flow, where the charge air flow is based on the fresh mass air flow and EGR exhaust flow, and a calculation module that determines a difference between the fresh mass airflow and the charge air flow and generates an EGR valve control signal based on the difference.

16 Claims, 4 Drawing Sheets

EXHAUST GAS RECIRCULATION ESTIMATION SYSTEM

FIELD OF THE INVENTION

The present invention relates to diesel engines, and more particularly to maintaining stable emissions of diesel engines.

BACKGROUND OF THE INVENTION

Diesel engine operation involves combustion that generates exhaust gas. During combustion, air is delivered through an intake valve to cylinders and fuel is injected into the cylinders forming an air/fuel mixture. The air/fuel mixture is combusted therein. Air flow delivered to the cylinders can be measured using a mass air flow (MAF) sensor. The MAF sensor measures the total intake of fresh air flow through an air induction system. After combustion, a piston forces exhaust gas in the cylinders into an exhaust system. The exhaust gas may contain various emission components including diesel particulates or soot.

Engine systems often include an exhaust gas recirculation (EGR) system to reduce engine emissions and combustion noise as well as to improve fuel economy. EGR involves re-circulating exhaust gases back into the cylinders, which reduces the amount of oxygen available for combustion and lowers cylinder temperatures. For exhaust gas to flow into the intake manifold, exhaust pressure must be greater than the intake manifold pressure (i.e. a boost condition). An EGR system enables ignition timing to remain at an optimum point, which improves fuel economy and/or performance.

Advanced combustion approaches, such as premixed charge compression ignition (PCCI), used to reduce emissions require large levels of EGR. Currently EGR rates are estimated from the change in air flow that occurs when an EGR valve is actuated. This method of EGR rate estimation is accurate during steady state operation. The accuracy of estimation tends to deteriorate during transient operation.

Transitioning between various load-speed conditions and the various levels of EGR during transient maneuvers can result in high emissions, noise levels, and fuel consumption. Additionally, current approaches of estimating the EGR level are dependent on calibrations conducted when the air and EGR passages are clean. These estimations are inaccurate when the EGR system becomes blocked (e.g. EGR cooler fouling).

SUMMARY OF THE INVENTION

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

A control system and method for an exhaust gas recirculation (EGR) system of an engine includes a first sensor that senses fresh mass air flow, a second sensor that senses charge air flow, where the charge air flow is based on the fresh mass air flow and EGR exhaust flow, and a calculation module that determines a difference between the fresh mass airflow and the charge air flow and generates an EGR valve control signal based on the difference.

In other features, the system further comprises a controller that controls an EGR valve based on at least one of the EGR valve control signal and an engine operating point. The engine operating point is based on at least one of engine speed and a fueling rate of the engine.

In other features, the system further comprises a bypass module that controls a bypass valve based on an at least one of an engine coolant temperature (Tcool) signal that indicates a temperature of an engine coolant and an EGR exhaust temperature (Texhaust) signal that indicates a temperature of the EGR exhaust, where the bypass valve selectively directs a portion of the EGR exhaust through a bypass conduit. The system further comprises a Tcool sensor that generates the Tcool signal and a Texhaust sensor that generates the Texhaust signal. The Texhaust sensor generates the Texhaust signal before the EGR exhaust flows through exhaust treatment devices.

In other features, the bypass module determines a degree of actuation of the bypass valve based on actuation map stored by the bypass module. The degree of actuation of the bypass valve is based on at least one of the Tcool and the Texhaust.

A control system for an exhaust gas recirculation (EGR) system of an engine includes an engine coolant temperature sensor that senses a temperature of an engine coolant (Tcool), an EGR temperature sensor that senses a temperature of EGR exhaust (Texhaust), and a bypass module that controls a bypass valve that selectively directs a portion of the EGR exhaust through a bypass conduit based on an at least one of the Tcool and the Texhaust.

In other features, the control system further comprises a calculation module that determines a difference between a mass air flow and a charge air flow and generates an EGR valve control signal based on the difference. The control system further comprises a controller that controls an EGR valve based on at least one of the EGR valve control signal and an engine operating point. The control system further comprises a first sensor that generates a mass air flow signal that indicates the mass air flow and a second sensor that generates a charge air flow signal that indicates charge air flow.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
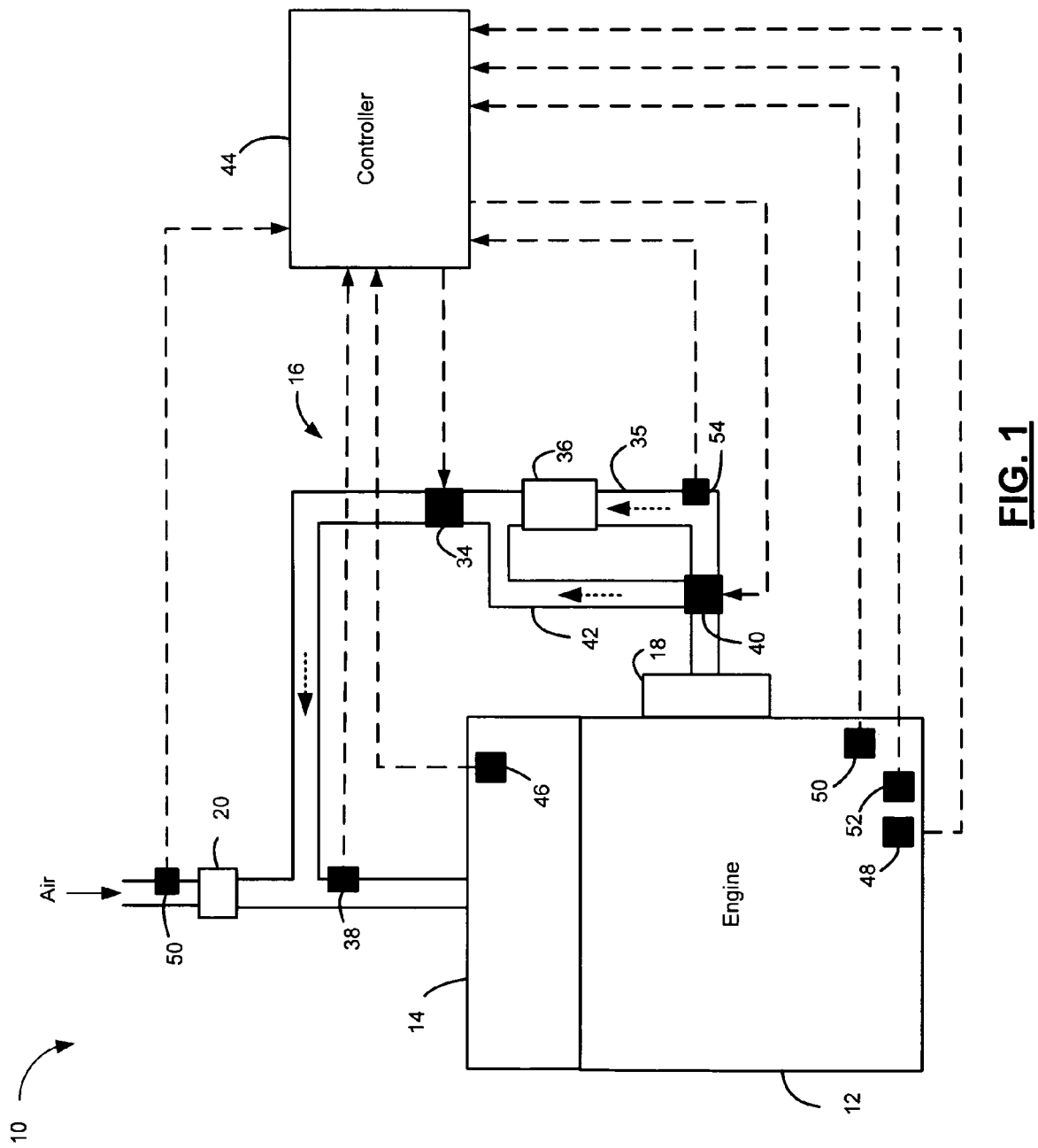
FIG. 1 is a functional block diagram of an exemplary diesel engine system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary diesel engine system 10 is schematically illustrated in accordance with the present invention. It is appreciated that the diesel engine system 10 is merely exemplary in nature and that the exhaust gas recirculation (EGR) estimation system described herein can be implemented in various diesel engine systems.

The diesel engine system 10 includes a diesel engine 12, an intake manifold 14, and an EGR system 16. The engine 12 combusts an air/fuel mixture within cylinders to drive pistons that rotatably drive a crankshaft. Exhaust from the combustion process is exhausted from the cylinders and into the exhaust manifold 18.

Air is drawn through a throttle 20 into the intake manifold 14, which distributes air to the cylinders. Fuel is injected into cylinders (e.g. by the common rail injection system) and the heat of the compressed air ignites the air/fuel mixture. The exhaust gas exits from the cylinders into the EGR system 16.

The EGR system 16 includes an exhaust gas recirculation (EGR) valve 34, an EGR conduit 35, an EGR cooler 36, a charge mass air flow (CMAF) sensor 38, an EGR bypass valve 40, and an EGR bypass conduit 42. The exhaust manifold 20 directs the exhaust segments from the cylinders into the EGR system 16. The EGR valve 34 re-circulates a portion of the exhaust (EGR exhaust) through the EGR conduit 35, as explained in further detail below. The EGR bypass valve 40 selectively directs a portion of the EGR exhaust (bypass exhaust) away from the EGR cooler 36 through the bypass conduit 42. The bypass exhaust is not cooled by the EGR cooler 36 prior to being re-circulated to intake manifold 14. The remainder of the exhaust is directed into an exhaust conduit (not shown). Conversely, the exhaust directed through the EGR conduit 35 is cooled.

A controller 44 regulates operation of the diesel engine system 10 according to the EGR estimation system of the present invention. More particularly, the controller 44 communicates with an intake manifold absolute pressure (MAP) sensor 46, an engine speed sensor 48, a mass air flow (MAF) sensor 50, an engine coolant temperature (Tcool) sensor 52, an exhaust temperature (Texhaust) sensor 54, and the CMAF sensor 38. The MAP sensor 46 generates a signal indicating the boost, and the engine speed sensor 48 generates a signal indicating engine speed (RPM). The Tcool sensor 52 generates a signal indicating the engine coolant temperature, and the exhaust temperature sensor 54 generates a signal indicating the EGR exhaust temperature. Preferably, the Texhaust sensor 54 determines the Texhaust prior to the EGR exhaust flowing through the EGR cooler 36 and/or other treatment devices (not shown).

The MAF sensor 50 generates a MAF signal indicating the fresh mass airflow into the intake manifold 14. The CMAF sensor 38 generates a CMAF signal indicating the CMAF into the intake manifold 14. The CMAF includes a mixture of fresh mass airflow and EGR flow. In various embodiments, the MAF sensor 48 and the CMAF sensor 38 can include a MAF temperature sensor (not shown) and a CMAF temperature sensor (not shown), respectively. The MAF temperature sensor and CMAF temperature sensor generate signals indicating a temperature of the fresh MAF and a temperature of the CMAF into the intake manifold 14, respectively. The controller 44 determines an engine load or engine operating point based in part on the RPM and fueling rates of the engine 12. The fueling rate is generally measured in fuel volume per combustion event. Engine output is controlled via the fueling rate.

The controller 44 determines an EGR rate based on engine load. For example, during periods of heavy engine load, the EGR rate is reduced to enable increased oxygen for combustion within the cylinders. During periods of low engine load, the EGR rate is increased to reduce oxygen intake into the cylinders, which reduces cylinder temperature and emissions. The EGR rate may vary from 0% to over 50% in the intake manifold 14. More specifically, the EGR rate reflects the amount of re-circulated exhaust. For example, an EGR rate of 20% recirculates 20% of the total amount of exhaust generated. The controller 44 controls the EGR valve 34 to achieve the desired EGR rate.

Figure 2:
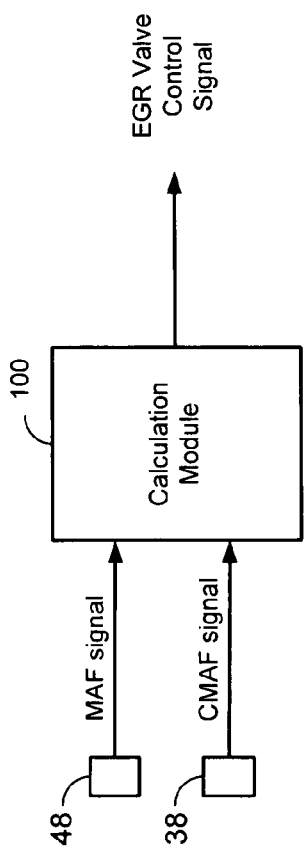
FIG. 2 is a functional block diagram depicting a calculation module in accordance with the present invention.

Referring now to FIG. 2, the controller 44 includes a calculation module 100 that receives a MAF signal and a CMAF signal sensed by the MAF sensor 50 and the CMAF sensor 38, respectively. The MAF signal indicates the total intake of fresh air flow through the air induction system. The CMAF signal indicates the mixture of fresh airflow and EGR exhaust gas. The calculation module 100 estimates the EGR flow rate of the diesel engine system 10. The calculation module 100 determines a value of the mass air flow based on the MAF signal and determines the value of the total charge air flow based on the CMAF signal. The calculation module 100 calculates a difference between the mass air flow and the charged air flow. The difference between the mass air flow and the charged mass air flow provides an accurate estimation of the EGR flow rate during steady state and transient engine operating conditions of the diesel engine system 10.

Figure 3:
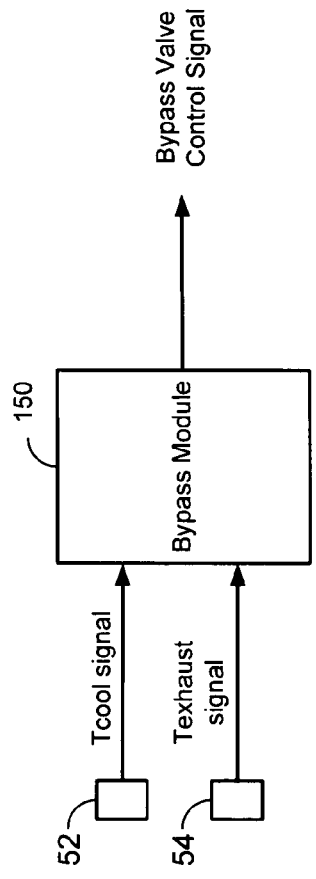
FIG. 3 is a functional block diagram depicting a bypass module in accordance with the present invention.

Referring to FIG. 3, the controller 44 includes a bypass module 150 that receives a Tcool signal and a Texhaust signal sensed by the Tcool sensor 52 and the Texhaust sensor 54, respectively. The bypass module 150 controls the bypass valve 40 based on the Tcool and the Texhaust. In various implementations, the bypass module 150 may determine a degree of actuation of the bypass valve 40 based on an actuation map (not shown) stored in a memory (not shown) of the bypass module 150. The actuation map may be indexed by the Tcool and Texhaust for an engine operating point of the engine 12.

Figure 4:
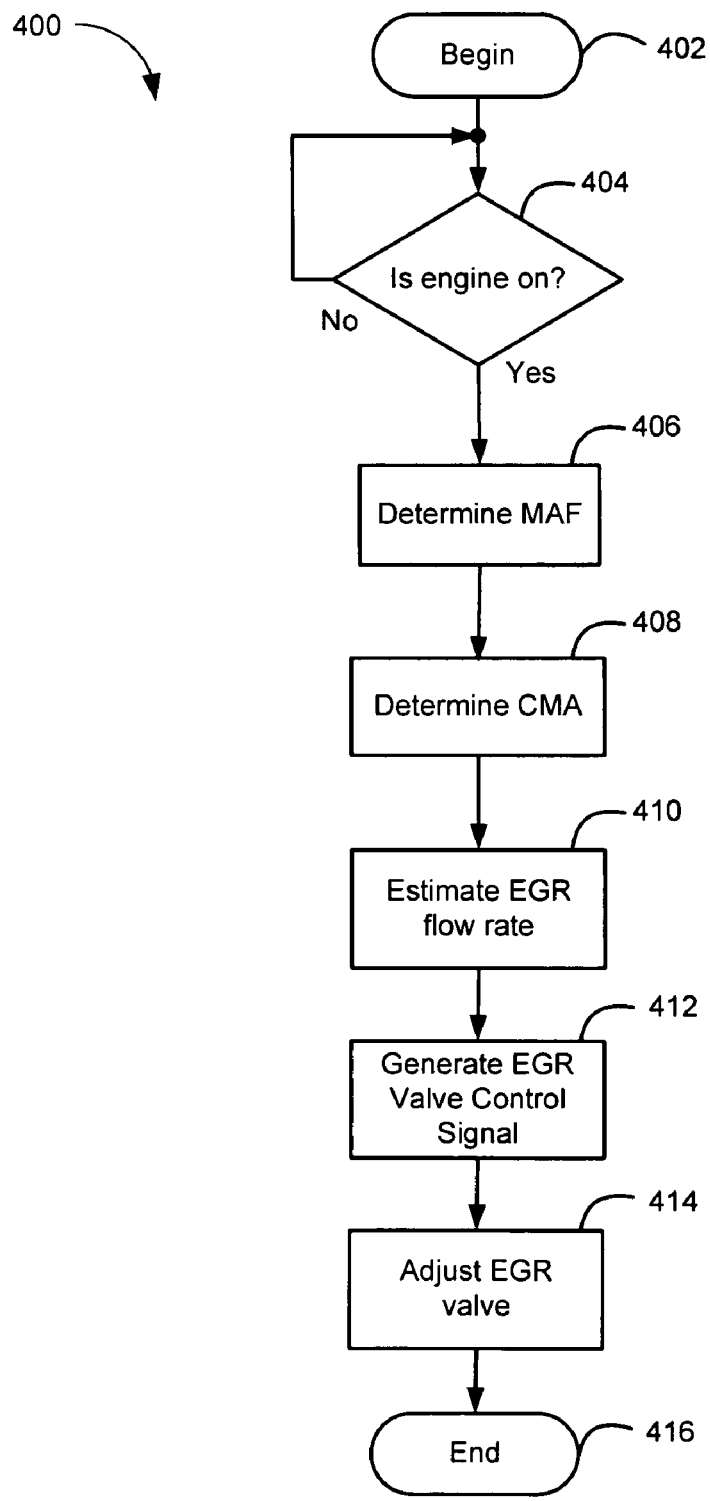
FIG. 4 is a flowchart illustrating exemplary steps executed by an EGR estimation system according to the present invention.

Referring now to FIG. 4, a method 400 of controlling EGR flow rate will be discussed in more detail. The controller 44 begins the method 400 in step 402. In step 404, the controller 44 determines whether the engine 12 is turned on. If the engine 12 is turned off, the method 400 returns to step 404. If the engine 12 is turned on, the controller 44 proceeds to step 406.

In step 406, the calculation module 100 determines the fresh mass air flow to the engine 12. In step 208, the calculation module 100 determines the charge mass flow to the engine 12. In step 410, the calculation module 100 estimates the EGR flow rate by determining the difference between the mass air flow and the charge air flow. In step 412, the controller 44 generates a control signal for the EGR valve 34 (EGR valve control signal). In step 414, the calculation module 100 adjusts the positioning of the EGR valve 34 based on the EGR valve control signal. The method 400 ends in step 416.

Figure 5:
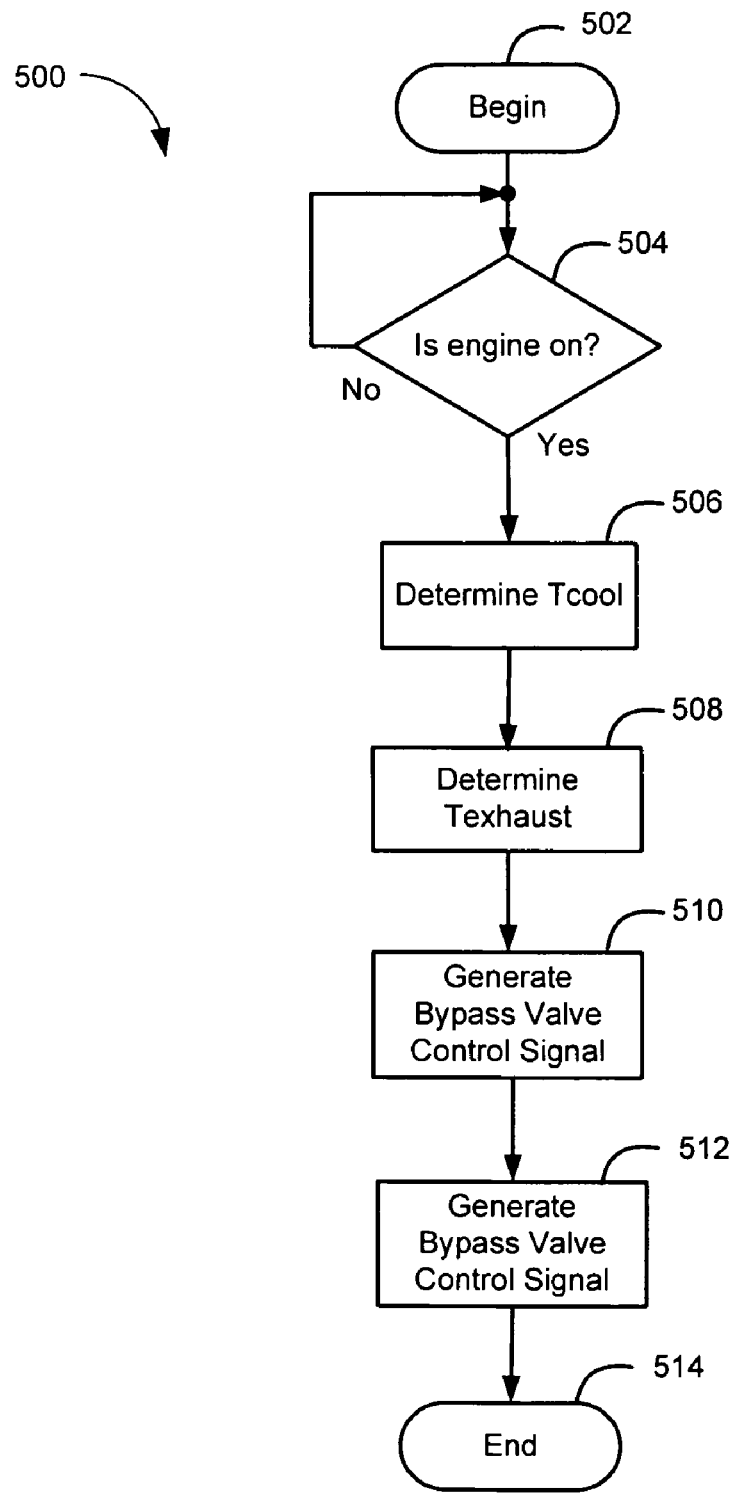
FIG. 5 is a flowchart illustrating exemplary steps executed by the bypass module in accordance with the present invention.

Referring now to FIG. 5, a method 500 of actuating the bypass module 150 will be discussed in more detail. The controller 44 begins the method 500 in step 502. In step 504, the controller 44 determines if the engine 12 is turned on. If the engine 12 is turned off, the method 500 returns to step 504. If the engine 12 is turned on, the controller 44 proceeds to step 506.

In step 506, the bypass module 150 determines the Tcool of the engine 12 at an operating point. In step 508, the bypass module 150 determines the Texhaust of the engine 12 at the operating point. In step 510, the bypass module 150 generates a control signal for the bypass valve 40 (bypass valve control signal) based on the Tcool and Texhaust. In step 512, the controller 44 adjusts the bypass valve 40 based on the bypass valve control signal. In step 514, the method 500 ends.

What is claimed is:

1. A control system for an exhaust gas recirculation (EGR) system of an engine, comprising:
    a first sensor that senses fresh mass air flow;
    a second sensor that senses charge air flow, wherein said charge air flow is based on said fresh mass air flow and EGR exhaust flow;
    a calculation module that determines a difference between said fresh mass airflow and said charge air flow and generates an EGR valve control signal based on said difference; and
    a bypass module that controls a bypass valve based on an engine coolant temperature (Tcool) signal that indicates a temperature of an engine coolant and an EGR exhaust temperature (Texhaust) signal that indicates a temperature of said EGR exhaust, wherein the bypass valve selectively directs a portion of said EGR exhaust through a bypass conduit.

2. The system of claim 1 wherein said engine operating point is based on at least one of engine speed and a fueling rate of the engine.

3. The system of claim 1 further comprising a Tcool sensor that generates said Tcool signal and a Texhaust sensor that generates said Texhaust signal.

4. The system of claim 3 wherein said Texhaust sensor generates said Texhaust signal before said EGR exhaust flows through exhaust treatment devices.

5. The system of claim 1 wherein said bypass module determines a degree of actuation of said bypass valve based on actuation map stored by said bypass module.

6. The system of claim 5 wherein said degree of actuation of said bypass valve is based on at least one of said Tcool and said Texhaust.

7. A control method for an exhaust gas recirculation (EGR) system of an engine, comprising:
    sensing fresh mass air flow to the engine;
    sensing charge air flow to the engine;
    determining a difference between said fresh mass airflow and said charge air flow and generating an EGR valve control signal based on said difference, wherein said charge air flow is based on said fresh air flow and EGR exhaust flow; and
    controlling a bypass valve based on an engine coolant temperature (Tcool) signal that indicates a temperature of an engine coolant and an EGR exhaust temperature (Texhaust) signal that indicates a temperature of said EGR exhaust.

8. The system of claim 7 wherein said engine operating point is based on at least one of engine speed and a fueling rate of the engine.

9. The method of claim 7 further comprising generating said Tcool signal and said Texhaust signal.

10. The method of claim 9 further comprising generating said Texhaust signal before said EGR exhaust flows through exhaust treatment devices.

11. The method of claim 7 further comprising determining a degree of actuation of said bypass valve based on actuation map stored by said bypass module.

12. The method of claim 11 wherein said degree of actuation of said bypass valve is based on at least one of said Tcool and said Texhaust.

13. A control system for an exhaust gas recirculation (EGR) system of an engine, comprising:
    an engine coolant temperature sensor that senses a temperature of an engine coolant (Tcool);
    an EGR temperature sensor that senses a temperature of EGR exhaust (Texhaust); and
    a bypass module that controls a bypass valve that selectively directs a portion of said EGR exhaust through a bypass conduit based on said Tcool and said Texhaust.

14. The control system of claim 13 further comprising a calculation module that determines a difference between a mass air flow and a charge air flow and generates an EGR valve control signal based on said difference.

15. The control system of claim 14 further comprising a controller that controls an EGR valve based on at least one of said EGR valve control signal and an engine operating point.

16. The control system of claim 14 further comprising a first sensor that generates a mass air flow signal that indicates said mass air flow and a second sensor that generates a charge air flow signal that indicates charge air flow.

* * * * *